(12) United States Patent
Xu et al.

(10) Patent No.: US 10,911,823 B2
(45) Date of Patent: Feb. 2, 2021

(54) MEDIA INFORMATION PROCESSING METHOD, APPARATUS AND SYSTEM

(71) Applicants: Shanghai Jiao Tong University, Shanghai (CN); ZTE CORPORATION, Shenzhen (CN)

(72) Inventors: Yiling Xu, Shenzhen (CN); Wenjun Zhang, Shenzhen (CN); Ying Hu, Shenzhen (CN); Zhao Wu, Shenzhen (CN); Ming Li, Shenzhen (CN); Ping Wu, Shenzhen (CN); Guoqiang Shang, Shenzhen (CN)

(73) Assignees: ZTE CORPORATION, Shenzhen (CN); SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 16/349,917

(22) PCT Filed: Oct. 28, 2017

(86) PCT No.: PCT/CN2017/108163
§ 371 (c)(1),
(2) Date: May 14, 2019

(87) PCT Pub. No.: WO2018/107913
PCT Pub. Date: Jun. 21, 2018

(65) Prior Publication Data
US 2019/0327523 A1   Oct. 24, 2019

(30) Foreign Application Priority Data
Dec. 12, 2016   (CN) .......................... 2016 1 1141843

(51) Int. Cl.
*H04N 21/442*   (2011.01)
*H04N 21/235*   (2011.01)
(Continued)

(52) U.S. Cl.
CPC ..... *H04N 21/44218* (2013.01); *H04N 21/235* (2013.01); *H04N 21/6587* (2013.01); *H04N 21/816* (2013.01); *H04N 21/84* (2013.01)

(58) Field of Classification Search
CPC ....... H04N 21/47217; H04N 21/44218; H04N 21/235; H04N 21/6587; H04N 21/816; H04N 21/84
(Continued)

(56) References Cited

U.S. PATENT DOCUMENTS

| 9,332,285 | B1 * | 5/2016 | Grant | ............... H04N 21/47205 |
| 2006/0017654 | A1 | 1/2006 | Romo | |
| 2017/0302972 | A1 * | 10/2017 | Zhang | ..................... H04L 67/38 |
| 2018/0007422 | A1 * | 1/2018 | Castleman | ........... H04N 21/441 |

(Continued)

FOREIGN PATENT DOCUMENTS

| CN | 102148818 A | 8/2011 |
| CN | 103873453 A | 6/2014 |

(Continued)

OTHER PUBLICATIONS

English Translation of International Search Report for International Application No. PCT/CN2017/108163 dated Feb. 1, 2018, 2 pages.
(Continued)

*Primary Examiner* — Dominic D Saltarelli
(74) *Attorney, Agent, or Firm* — Cantor Colburn LLP (57) ABSTRACT

Provided are a media information processing method, apparatus and system. The method comprises: generating media indication information according to a media state and/or a media state change, wherein the media indication information at least comprises one of the following: a media identifier, a media state type, a media state change type, a media state description, and a media state change description; and sending or storing the media indication information. By means of the present disclosure, the problem in the relevant art that the covered content in media information is
(Continued)

incomplete during a media interaction is solved, thereby achieving the effect of improving the media information integrity and expandability.

11 Claims, 4 Drawing Sheets

(51) Int. Cl.
  *H04N 21/658* (2011.01)
  *H04N 21/81* (2011.01)
  *H04N 21/84* (2011.01)
  *H04N 21/6587* (2011.01)

(58) Field of Classification Search
  USPC .......................................................... 725/10
  See application file for complete search history.

(56) References Cited

U.S. PATENT DOCUMENTS

| | | | |
|---|---|---|---|
| 2018/0077210 A1* | 3/2018 | Hannuksela | H04N 21/47217 |
| 2018/0091577 A1* | 3/2018 | Park | G06F 3/012 |
| 2018/0121069 A1* | 5/2018 | DiVerdi | G06F 3/011 |

FOREIGN PATENT DOCUMENTS

| | | |
|---|---|---|
| CN | 104735464 A | 6/2015 |
| CN | 104793741 A | 7/2015 |
| CN | 105359054 A | 2/2016 |
| CN | 106095235 A | 11/2016 |

OTHER PUBLICATIONS

Office Action issued in Chinese Patent Application No. 201611141843.9, dated Jul. 7, 2020; 6 pages.

* cited by examiner

Receiving or reading media indication information, wherein the media indication information comprises at least one of: a media identifier, a media state type, a media state change type, a media state description, and a media state change description — S502

Performing an operation according to the media indication information — S504

MEDIA INFORMATION PROCESSING METHOD, APPARATUS AND SYSTEM

CROSS-REFERENCE TO RELATED APPLICATION

This application is the 371 application of PCT Application No. PCT/CN2017/108163, filed on Oct. 28, 2017, which is based upon and claims priority to Chinese Patent Application No. 201611141843.9, filed on Dec. 12, 2016, the entire contents of which are incorporated herein by reference.

TECHNICAL FIELD

The present disclosure relates to the field of communications, and in particular, to a method, apparatus and system for processing media information.

BACKGROUND

With rapid development of digital multimedia technology, users are increasingly seeking video with high definition, high fluency and high fidelity. What is behind the need of a user is the user's expectation and pursuit of multimedia video simulation reality experience. As a result, immersive media has come into being. Immersive media (such as virtual reality video, holographic video and light field video) simulates a physical scene in the real or virtual world and allows users to interact with the scene in real time. Immersive media, different from ordinary media, realizes the interaction between the user and the scene because it simulates the physical scene of real perception and real-time interaction. How to realize the interaction in immersive media is a problem that must be solved in the development of immersive media.

In order to solve the problem on interaction in immersive media, some existing media protocols propose sending messages about the user's area of interest, but they do not form a complete system, and they cannot cover various types of interaction information in immersive media.

Therefore, there is no effective solution for the problem in the related art that the media information coverage content is incomplete during media interaction.

This section provides background information related to the present disclosure which is not necessarily prior art.

SUMMARY

Embodiments of the present disclosure provide a method, an apparatus, and a system for processing media information, so as to at least solve the problem in the related art that the content covered in the media information during media interaction is incomplete.

According to an embodiment of the present disclosure, there is provided a media information processing method, including: generating media indication information according to media state and/or media state change, wherein the media indication information includes at least one of: a media identifier, a media state type, a media state change type, a media state description, and a media state change description; and sending or storing the media indication information.

Alternatively, the media identifier includes at least one of: an identifier for indicating media type, an identifier for indicating that the media is all or part of media, and an identifier for indicating content of the all or part of the media.

Alternatively, the media state type or the media state change type is indicated by different identifiers.

Alternatively, the media state type or the media state change type includes at least one of the following types: no behavior, tracking target, gazing at a target area, moving, touching the target area, and vibrating.

Alternatively, the media state description or the media state change description comprises at least one of the followings: position information of three-dimensional coordinates, movement velocity type, movement velocity component value, orientation component value, movement duration, vibration frequency, and vibration intensity, wherein the movement velocity type includes linear movement velocity and angular movement velocity.

Alternatively, generating media indication information according to media state and/or media state change comprises: determining, according to the media state and/or media state change, part or all of content in the media indication information; and generating, according to combination of the part or all of the content, the media indication information.

According to another embodiment of the present disclosure, there is provided a media information processing method. The method comprises: receiving or reading media indication information, wherein the media indication information comprises at least one of: a media identifier, a media state type, a media state change type, a media state description, and a media state change description; and performing an operation according to the media indication information.

Alternatively, the media identifier includes at least one of: an identifier for indicating media type, an identifier for indicating that the media is all or part of media, and an identifier for indicating content of the all or part of the media.

Alternatively, the media state type or the media state change type is indicated by different identifiers.

Alternatively, the media state type or the media state change type includes at least one of the following types: no behavior, tracking target, gazing at a target area, moving, touching the target area, and vibrating.

Alternatively, the media state description or the media state change description comprises at least one of the followings: position information of three-dimensional coordinates, movement velocity type, movement velocity component value, orientation component value, movement duration, vibration frequency, and vibration intensity, wherein the movement velocity type includes linear movement velocity and angular movement velocity.

Alternatively, performing an operation according to the media indication information comprises at least one of the following operations: no operation, media state update operation, and media action operation.

According to another embodiment of the present disclosure, there is provided a media information processing apparatus, including: a generating module, configured to generate media indication information according to media state and/or media state change, wherein the media indication information includes at least one of: a media identifier, a media state type, a media state change type, a media state description, and a media state change description; and a first processing module, configured to send or store the media indication information.

Alternatively, the generating module comprises: a determining unit, configured to, according to the media state and/or media state change, determine part or all content of the media indication information; and a generating unit, configured to, according to a combination of the part or all of the content, generate the media indication information.

According to another embodiment of the present disclosure, there is provided a media information processing apparatus, including: a second processing module, configured to receive or read media indication information, wherein the media indication information comprises at least one of: a media identifier, a media state type, a media state change type, a media state description, and a media state change description; and a third processing module, configured to perform corresponding operation according to the media indication information.

According to a further embodiment of the present disclosure, there is provided a media information processing system, characterized in that, the system comprises: a sending end, configured to generate media indication information according to media state and/or media state change, and send or store the media indication information, wherein the media indication information includes at least one of: a media identifier, a media state type, a media state change type, a media state description, and a media state change description; and a receiving end, configured to receive or read media indication information, and perform corresponding operation according to the media indication information.

According to still another embodiment of the present disclosure, there is provided a storage medium, configured to store program code for performing the following steps: generating media indication information according to media state and/or media state change, wherein the media indication information includes at least one of the followings: a media identifier, a media state type, a state change type, a media state description, and a media state change description; and sending or storing the media indication information.

Alternatively, the storage medium is further configured to store program code for performing the following steps: receiving or reading media indication information, wherein the media indication information comprises at least one of: a media identifier, a media state type, a media state change type, a media state description, and a media state change description; and performing an operation according to the media indication information.

By means of the present disclosure, the media indication information is generated according to the media state and/or the media state change, wherein the media indication information includes at least one of the following: a media identifier, a media state type, a media state change type, a media state description, and a media state change description; and the media indication information is sent or stored. That is to say, the media indication information covering the complete content is generated according to the media state and/or the state change, thereby solving the problem in the related art that the content covered in the media information is incomplete during the media interaction, and the media information integrity and extensibility is improved.

This section provides a summary of various implementations or examples of the technology described in the disclosure, and is not a comprehensive disclosure of the full scope or all features of the disclosed technology.

BRIEF DESCRIPTION OF THE DRAWINGS

The Drawings described herein are used to provide a further understanding of the present disclosure, forming a part of the present disclosure, and the exemplary embodiments of the present disclosure and the description thereof are not intended to limit the disclosure. In the Drawings.

DETAILED DESCRIPTION

The present disclosure will be described in detail below with reference to the Drawings in conjunction with the embodiments. It should be noted that the embodiments in the present application and the features in the embodiments may be combined with each other without conflict.

It is to be understood that the terms "first", "second", and the like in the Description and Claims of the present disclosure are used to distinguish similar objects, and are not necessarily used to describe a particular order.

Embodiment 1

Figure 1:
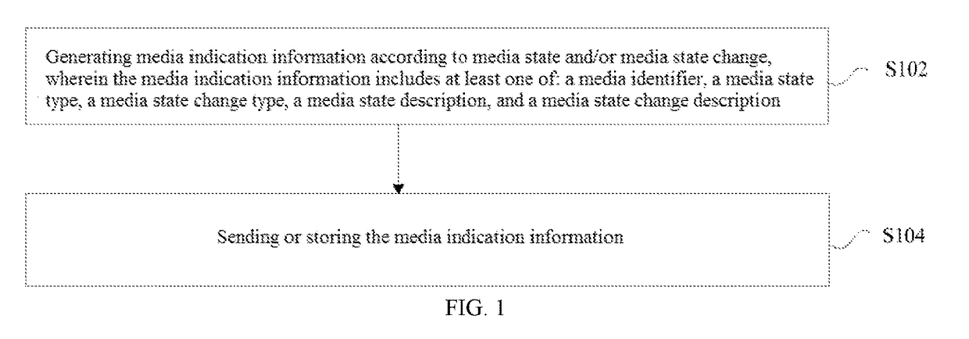
FIG. 1 is a flowchart of a method for processing media information according to an embodiment of the present disclosure.

In this embodiment, a method for processing media information is provided. FIG. 1 is a flowchart of a method for processing media information according to an embodiment of the present disclosure. As shown in FIG. 1, the method includes the following steps:

In step S102, media indication information is generated according to media state and/or media state change, wherein the media indication information includes at least one of the followings: a media identifier, a media state type, a state change type, a media state description, and a media state change description.

Alternatively, the above media identifier includes at least one of the followings: an identifier for indicating the media type, an identifier for indicating that the media is all or part of the media, and an identifier for indicating content of the all or part of the media. For example, the media identifier may include, but is not limited to, a helmet device identifier, a hardware left/right controller identifier, and a user ID.

The media state description or media state change description includes at least one of the followings: position information of three-dimensional coordinates, type of movement velocity, movement velocity component value, orientation component value, movement duration, vibration frequency, and vibration intensity, wherein the type of movement velocity includes linear movement velocity and angular movement velocity.

In step S104, the media indication information is sent or stored.

Alternatively, in this embodiment, the executive body of the foregoing method for processing media information includes, but is not limited to, a client device that can perform media information processing.

In this embodiment, the application scenario of the method for processing the media information includes, but is not limited to, the message interaction of the immersive media. In this scenario, the client device generates the media indication information according to the media state and/or the media state change, wherein the media indication information includes at least one of the followings: a media identifier, a media state type, a media state change type, a media state description, a media state change description, and the media indication information is sent or stored. That is to say, the client device generates the media indication information which covers the complete content according to the media state and/or the state change, thereby solving the problem that the content covered in the media information is incomplete during the media interaction in the related art, and achieving the effect that the integrity and extensibility of media information is improved.

Hereinafter, in conjunction with an exemplary application scenario, the above media information processing method will be described.

As to the need for an interaction mechanism in immersive media consumption, embodiments of the disclosure provide a method for processing immersive media interaction message. The following technical solution is mainly adopted:

An interaction mechanism for immersive media is provided, mainly to construct a basic model of four parts: media information—interaction target—interaction type—interaction content, and meanwhile, define the content of each part of the four parts of the model. According to the interaction behavior of the user, the four parts of the interaction model are correspondingly encapsulated to define a complete message.

The information to be added to indicate the media information, the interaction target, the interaction type and the interaction content can be diverse. Preferably, the following set of information is used as an example:

Information 1: user identifier information, which uniquely identifies the identity of the user for the server;

Information 2: information, which indicates specific interaction target;

Information 3: information, which indicates specific interaction type;

Information 4: information, which indicates specific interaction information that is related to particular interaction target and type.

For the classification of interaction target and interaction type, in embodiments of the present disclosure, some basic interaction targets and interaction types are summarized by summarizing the current immersive media device and the interaction manner, but it should be noted that in embodiments of the present disclosure, the interaction target and interaction type can be extended accordingly for new interactions.

An exemplary immersive media processing mechanism includes the following steps:

In Step S11, a sending end (for example, the client device) obtains the following information, then encapsulates it into media information, and finally sends or stores it: 1) media identification information; 2) interaction target or type; 3) interaction content;

In Step S12, a receiving end (for example, the server) receives or reads the media information, and extracts following corresponding content: 1) media identification information; 2) interaction target or type; 3) interaction content;

In Step S13, the receiving end performs corresponding processing according to the received information.

Compared with the related art, the above-mentioned interaction message model for immersive media provided by embodiments of the present disclosure realizes classification and indication of interaction information.

In an alternative implementation manner, the media state type or the media state change type may be indicated by different identifiers, wherein the media state type and/or the media state change type includes at least one of the following types: no behavior, tracking target, gazing at the target area, moving, touching the target area, and vibrating.

Alternatively, generating the media indication information according to the media state and/or the media state change includes the following steps;

Step S21, determining, according to the media state and/or media state change, part or all of the content in the media indication information;

Step S22, generating, according to combination of the part or all of the content, the media indication information.

By means of the above steps S21 and S22, relatively complete media indication information is generated, and extensibility and compatibility of the media indication information is improved.

The present embodiment will be exemplified below with reference to illustrative examples.

It should be noted that, in this embodiment, the interaction of the immersive media is mainly used as the main application scenario, but the present disclosure is not limited to this. In embodiments of the present disclosure, an interaction mechanism is designed for the interaction behavior of the immersive media, and the interaction behavior is encapsulated into an interaction signaling message by using the interaction model constructed in the embodiment of the disclosure, and the interaction signaling message is transmitted between the sending end and the receiving end.

With the rise and development of immersive media, the problems in immersive media transmission are gradually exposed. In the existing immersive media, the immaturity of the interaction mechanism is still an urgent problem to be solved. The present disclosure proposes an interaction mechanism in immersive media for the blank of current technology.

In order to implement the interaction message model and the simplification and classification of the content of the interaction message in the present disclosure, it is necessary to add necessary information to the existing media transmission protocol for indication, including:

message_source, because the interaction message can be transmitted between the server and the user, this field may be used to indicate the source of the interaction message, i.e., from the server or from the user;

user_id, user identifier, indicating the identity of the user, belonging to the user information;

asset_id, a media resource identifier, indicating the media content being currently consumed by the user, belonging to media information;

interaction_target, indicating the current interaction target of the user, including the current state of the helmet device, the current state of area of the user's interests, the current state of the user, the hardware left controller, the hardware right controller, etc.; the value of the interaction target is as shown in Table 1.

TABLE 1

| Type | Value | Description |
|---|---|---|
| Null | 0 | The interaction target is Null, that is, there is no specific interaction target. |
| HMD_state | 1 | The interaction target is the current state of the helmet device. |
| ROI_state | 2 | The interaction target is the current state of the area of user's interests. |
| User_state | 3 | The interaction target is the current state of the user. |
| ControllerL_state | 4 | The interaction target is the state of hardware left controller; if there is only one controller, it is deemed to be the left controller. |
| ControllerR_state | 5 | The interaction target is the state of hardware right controller. | interaction_type, indicating the type of interaction behavior performed by the user for the current interaction_target. The value of this field is related to interaction_target, including tracking, gazing, moving, touching, vibrating, etc. The value of the interaction type is shown in Table 2.

TABLE 2

| Type | Value | Description |
|---|---|---|
| Null | 0 | The interaction type is Null, that is, there is no specific interaction type. |
| Tracking | 1 | The interaction type is Tracking. |
| Gaze | 2 | The interaction type is Gazing. |
| Move | 3 | The interaction type is Moving. |
| Touch | 4 | The interaction type is Touching. |
| Vibrate | 5 | The interaction type is Vibrating. | interaction_num, the number of interactions included in the current signaling;

timestamp, the time of the current interaction;

position_x, the x component value of the position information, belonging to the interaction content;

position_y, the y component value of the position information, belonging to the interaction content;

position_z, the z component value of the position information, belonging to the interaction content;

velocity_type, the type of movement velocity, belonging to interaction content, wherein its value is shown in Table 3.

TABLE 3

| Type | Value | Description |
|---|---|---|
| Linear | 0 | Movement velocity type is linear velocity. |
| Angular | 1 | Movement velocity type is angular velocity. | velocity_x, the value of the x component of the movement velocity, belonging to the interaction content;

velocity_y, the value of the y component of the movement velocity, belonging to the interaction content;

velocity_z, the value of the z component of the movement velocity, belonging to the interaction content;

orientation_x, the value of the x component of the orientation, belonging to the interaction content;

orientation_y, the value of the y component of the orientation, belonging to the interaction content;

orientation_z, the value of the z component of the orientation, belonging to the interaction content;

orientation_w, the value of the w component of the orientation, belonging to the interaction content;

sustain_time, duration, belonging interaction content;

frequency, belonging to the interaction content, wherein its value is a percentage of the maximum vibration frequency of the corresponding device;

intensity, belonging to the interaction content, wherein its value is a percentage of the maximum vibration intensity of the corresponding device;

In order to realize the interaction mechanism proposed in the disclosure, the above information needs to be added to the existing media transmission protocol for indication, and the present disclosure does not limit the manner in which the above information is added. Hereinafter, an example of adding the above information to MPEG Media Transport (MMT) is described by taking MMT as an example, including:

Signaling information form: constructing the interaction signaling information interaction_feedback_message( ) to indicate the specific content of the user. Preferably, the form shown in Table 4 below can be used:

TABLE 4

| Grammar | Value | Number of bits | Type |
|---|---|---|---|
| interaction_feedback_message( ) { | | | |
|     message_id | | 16 | uimsbf |
|     version | | 8 | uimsbf |
|     length | | 32 | uimsbf |
|     message_payload { | | | |
|         message_source | | 1 | uimsbf |
|         reserved | | 7 | uimsbf |
|         user_id | | 32 | uimsbf |
|         asset_id | | | |
|         interaction_num | N | 8 | uimsbf |
|         for(i==0;i<N;i++){ | | | |
|             timestamp | | | |
|             interaction_target | | 8 | uimsbf |
|             interaction_type | | 8 | uimsbf |
|             if(interaction_target==1 | | | |
|             &&interaction_type==1){ | | | |
|                 position_x | | 32 | double |
|                 position_y | | 32 | double |
|                 position_z | | 32 | double |
|                 velocity_type | | 8 | uimsbf |
|                 velocity_x | | 32 | double |
|                 velocity_y | | 32 | double |
|                 velocity_z | | 32 | double |
|                 orientation_x | | 32 | double |
|                 orientation_y | | 32 | double |
|                 orientation_z | | 32 | double |
|                 orientation_w | | 32 | double |
|             } | | | |
|             if(interaction_target==4 | | | |
|             &&interaction_type==5){ | | | |
|                 frequency | | 8 | uimsbf |
|             } | | | |
|         } | | | |
|     } | | | |
| } | | | |

The meaning of the fields in Table 4 has been explained above.

Signaling table form: The interaction signaling table interaction_feedback_table( ) is constructed to indicate the specific content of the user. Preferably, the form shown in Table 5 below can be adopted:

TABLE 5

| Grammar | Value | Number of bits | Type |
|---|---|---|---|
| interaction_feedback_table( ) { | | | |
|     table_id | | 8 | uimsbf |
|     version | | 8 | uimsbf |
|     length | | 32 | uimsbf |
|     table_payload { | | | |
|         message_source | | 1 | uimsbf |
|         reserved | | 7 | uimsbf |
|         user_id | | 32 | uimsbf |

TABLE 5-continued

| Grammar | Value | Number of bits | Type |
| --- | --- | --- | --- |
| asset_id | | | |
| interaction_num | N | 8 | uimsbf |
| for(i==0;i<N;i++){ | | | |
| timestamp | | | |
| interaction_target | | 8 | uimsbf |
| interaction_type | | 8 | uimsbf |
| if(interaction_target==1 | | | |
| &&interaction_type==1){ | | | |
| position_x | | 32 | double |
| position_y | | 32 | double |
| position_z | | 32 | double |
| velocity_type | | 8 | uimsbf |
| velocity_x | | 32 | double |
| velocity_y | | 32 | double |
| velocity_z | | 32 | double |
| orientation_x | | 32 | double |
| orientation_y | | 32 | double |
| orientation_z | | 32 | double |
| orientation_w | | 32 | double |
| } | | | |
| if(interaction_target==4 | | | |
| &&interaction_type==5){ | | | |
| frequency | | 8 | uimsbf |
| } | | | |
| } | | | |
| } | | | |
| } | | | |

The meaning of the fields in Table 5 has been explained above.

In the above examples of the signaling information and the signaling table, only examples that the interaction target is head-mounted device state and the interaction type is tracking, as well as the interaction target is user-interactive device state and the interaction type is vibrating are shown. In actual operation, the interaction content encapsulated in the interaction signaling can be dynamically changed and combined according to the actual interaction_target and interaction_type of the user.

Figure 2:
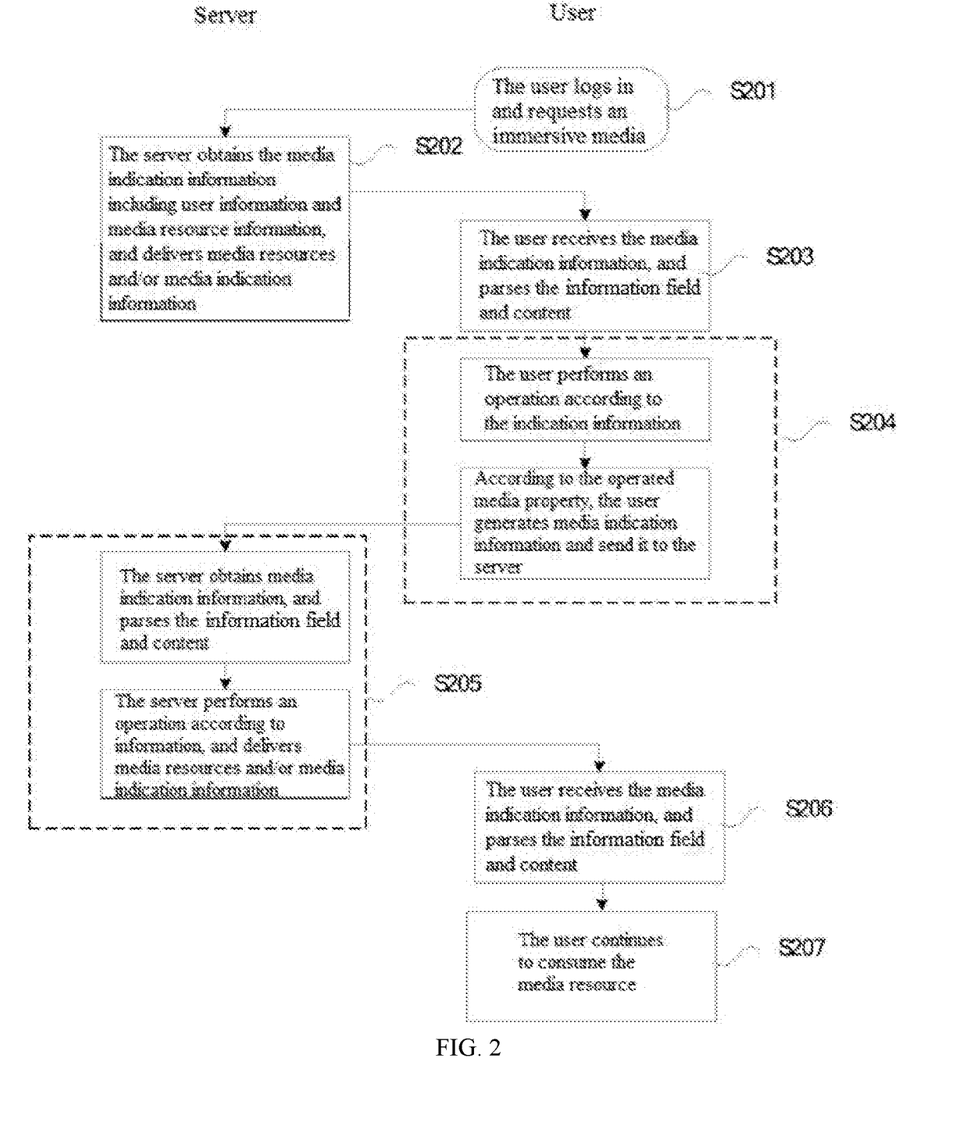
FIG. 2 is a flowchart of an immersive media information interaction process in accordance with an embodiment of the present disclosure.

It should be noted that, on the basis of the embodiment of the present disclosure, the interaction target, the interaction type, and the interaction content are extended, which falls into the protection scope of the present disclosure without departing from the interaction model of the present disclosure. Hereinafter, the application method of the embodiment of the disclosure is described by taking the interaction signaling information (interaction_feedback_message) as an example. The schematic diagram of the process is shown in FIG. 2, which mainly includes the following steps.

In Step S201, the user logs in and requests an immersive media resource.

In Step S202, the server obtains the media information, assigns, for the user, a unique user_id on the server, and constructs interaction_feedback_message, wherein the message_source is 1, indicating that it is sent from the server to the user. The user_id is a unique identifier assigned by the server to the user, asset_id is the identifier of the immersive media resource requested by the user, and the interaction_num is 0. The server delivers immersive media resources, interaction_feedback_message, and other necessary signaling information to the user.

In Step S203, the user receives the corresponding immersive media resource, necessary signaling information and consumes the video, and the user_id is parsed from the interaction_feedback_message.

In Step S204, in the process of watching the immersive video, if interaction is made, the user constructs interaction-_feedback_message, wherein the message_source is 0, indicating that it is sent from the user to the server. User_id is the user_id parsed in Step 203, asset_id is the asset_id of the immersive video which the user is currently viewing, the interaction_num is 1, and the timestamp is the current time.

If the interaction action at this time is helmet movement, the interaction_target will be 1 and the interaction_type will be 1. Then, position_x, position_y, position_z, velocity_type, velocity_x, velocity_y, velocity_z, orientation_x, orientation_y, orientation_z, orientation_w, etc. are sequentially encapsulated according to the actual sensor information. The user sends the interaction_feedback_message to the server.

If the interaction action at this time is that the user gazes at an area of the immersive video, the interaction_target will be 2 and the interaction_type will be 2. Then, the position_x, position_y, position_z, sustain_time, etc. are sequentially encapsulated according to the actual sensor information. The user sends the interaction_feedback_message to the server.

If the interaction at this time is that the user moves an area of the immersive video, the interaction_target will be 2 and the interaction_type will be 3. Then, the position_x, position_y, position_z, velocity_type, velocity_x, velocity_y, velocity_z, etc. are sequentially encapsulated according to the actual sensor information. The user sends the interaction_feedback_message to the server.

If the interaction at this time is that the user touches an area of the immersive video, the interaction_target will be 2 and the interaction_type will be 4. The user sends the interaction_feedback_message to the server.

If the interaction at this time is the user moves, the interaction_target will be 3 and the interaction_type will be 1. The position_x, position_y, velocity_type, velocity_x, velocity_y, orientation_x, orientation_y, orientation_z, orientation_w, etc. are then sequentially encapsulated according to the actual sensor information. The user sends the interaction_feedback_message to the server.

In Step S205, the server receives the user's interaction_feedback_message, parses the content therein, and uses the data therein to make related calculations. If the media content consumed by the user needs to be changed at this time, and a vibration needs to be made on the user's left controller, the server will construct the interaction_feedback_message, wherein the message_source is 1, indicating that the message is sent from the server to the user, user_id is the user_id of the user, asset_id is the asset_id corresponding to the new media resource, the interaction_num is 1, and the timestamp is the current time. Since the interaction is for the hardware left control, the interaction_target is 4, the interaction_type is 5, and the frequency is 50, indicating that the vibration is performed according to 50% of the maximum vibration frequency of the hardware left controller. The server sends a new immersive media resource, encapsulated interaction_feedback_message, and other necessary signaling information to the user.

In Step S206, the user receives the media resource, interaction_feedback_message and other signaling information sent by the server, consumes new corresponding media resource by further combining other signaling information, and parses the interaction_feedback_message. According to the information in the interaction_feedback_message, the hardware left controller vibrates at 50% of the maximum vibration frequency.

In step S207, the user continues to consume the immersive media resource.

In the embodiment of the present disclosure, the proposed solution is exemplified by MMT, but these solutions can also be used in other file encapsulation, transmission systems and protocols. The interaction mechanism applied in the embodiment of the present disclosure is described by taking the MMT as an example, but is not limited thereto, and all the schemes for indicating the immersive media interaction information can be combined with the disclosure. The embodiment of the disclosure constructs a model of immersive media interaction, which uses media information, interaction targets, interaction types, and interaction content as basic parts of interaction information, classifies each part, and lists common media information, interaction target, interaction type and interaction content. These specific interaction types, interaction content and interaction information can be flexibly combined with each other, so as to represent corresponding interaction behavior.

Through the description of the above embodiments, those skilled in the art can clearly understand that the method according to the above embodiment can be implemented by means of software plus a necessary general hardware platform, and of course, by hardware; but in many cases, the former is a better implementation. Based on such understanding, the technical solution of the present disclosure, which is essential or contributes to the related art, may be embodied in the form of a software product stored in a storage medium (such as ROM/RAM, disk, the optical disc), including a number of instructions for causing a terminal device (which may be a cell phone, a computer, a server, or a network device, etc.) to perform the methods described in various embodiments of the present disclosure.

Embodiment 2

In this embodiment, an apparatus for processing media information is provided, which is used to implement the foregoing embodiments and preferred embodiments, and details which have been described will not be described again. As used below, the term "module" may implement a combination of software and/or hardware of a predetermined function. Although the apparatus described in the following embodiments is preferably implemented in software, in fact, hardware, or a combination of software and hardware is also possible and contemplated.

Figure 3:
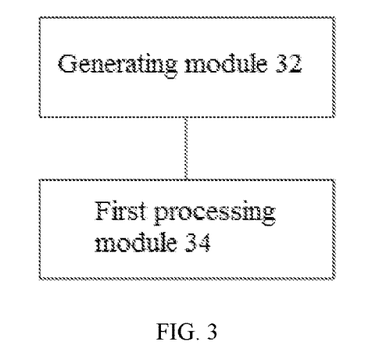
FIG. 3 is a structural block diagram of an apparatus for processing media information according to an embodiment of the present disclosure.

FIG. 3 is a block diagram of an apparatus for processing media information according to an embodiment of the present disclosure; as shown in FIG. 3, the apparatus includes:

1) a generating module 32, configured to generate media indication information according to the media state and/or the media state change, wherein the media indication information includes at least one of the following: a media identifier, a media state type, a media state change type, a media state description, and a media state change description;

2) a first processing module 34, configured to send or store the media indication information.

Through the apparatus shown in FIG. 3, the problem in the related art that the content covered in the media information during the media interaction is incomplete is solved, and the effect of improving the integrity and extensibility of the media information is achieved.

Alternatively, the above media identifier includes at least one of the followings: an identifier for indicating the media type, an identifier for indicating that the media is all or part of the media, and an identifier for indicating the content of the all or part of the media.

In an alternative implementation manner, the media state type or the media state change type may be indicated by different identifiers, wherein the media state type or the media state change type includes at least one of the following types: no behavior, tracking target, gazing at the target area, moving, touching the target area, and vibrating.

The media state description or media state change description includes at least one of: position information of three-dimensional coordinates, type of movement velocity, movement velocity component value, orientation component value, movement duration, vibration frequency, and vibration intensity, wherein the movement velocity type includes: linear movement velocity, angular movement velocity.

Figure 4:
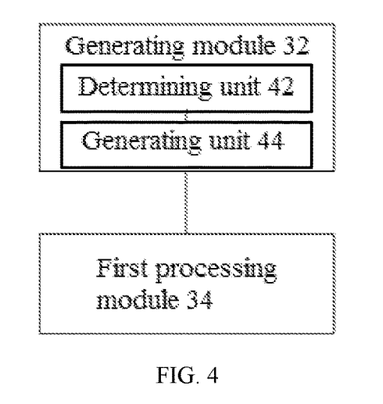
FIG. 4 is a structural block diagram (I) of an apparatus for processing media information according to an embodiment of the present disclosure.

FIG. 4 is a structural block diagram (I) of an apparatus for processing media information according to an embodiment of the present disclosure. As shown in FIG. 4, the generating module 32 involved in FIG. 3 includes:

1) a determining unit 42, configured to, according to the media state and/or media state change, determine part or all content of the media indication information;

2) a generating unit 44, configured to, according to the combination of the part or all of the content, generate the media indication information.

Through the apparatus shown in FIG. 4, relatively complete media indication information is generated, and the extensibility and compatibility of the media indication information is improved.

It should be noted that each of the above modules may be implemented by software or hardware. For the latter, the above modules may be achieved by, but not limited to the following implementations: the modules are all located in the same processor; or, the above modules are located in different processors in any combination.

Embodiment 3

Figure 5:
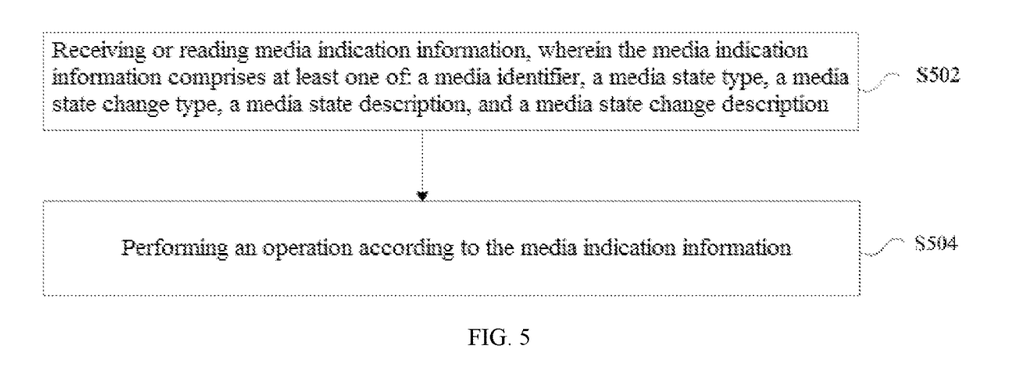
FIG. 5 is a flowchart of a method for processing media information according to an embodiment of the present disclosure.

A method for processing media information is also provided in this embodiment. FIG. 5 is a flowchart of a method for processing media information according to an embodiment of the present disclosure. As shown in FIG. 5, the process includes the following steps.

In Step S502: media indication information is received or read, wherein the media indication information includes at least one of the followings: a media identifier, a media state type, a media state change type, a media state description, and a media state change description.

It should be noted that the foregoing media identifier includes at least one of the followings: an identifier for indicating the media type, an identifier for indicating that the media is all or part of the media, and an identifier for indicating content of the all or part of the media.

The media state description or media state change description includes at least one of: position information of three-dimensional coordinates, movement velocity type, movement velocity component value, orientation component value, movement duration, vibration frequency, and vibration intensity, wherein the movement velocity type includes linear movement velocity and angular movement velocity.

In Step S504, an operation is performed according to the media indication information.

It should be noted that the foregoing operations according to the media indication information include at least one of the following operations: no operation, media state update operation, and media action operation.

Alternatively, in this embodiment, the executive body of the foregoing method for processing media information includes but is not limited to a server.

In this embodiment, the application scenario of the above method for processing the media information includes, but is not limited to, a message interaction of the immersive media. In the application scenario, the server receives or reads the media indication information, wherein the media indication information includes at least one of the following contents: media identification, media state type, media state change type, media state description, media state change description, and operation is performed according to the media indication information, thereby solving the problem in the related art that the content covered in the media information during the media interaction is incomplete is solved, and the effect of improving the integrity and extensibility of the media information is achieved.

In an alternative implementation manner, the media state type or the media state change type may be indicated by different identifiers, wherein the media state type or the media state change type includes at least one of the following types: no behavior, tracking target, gazing at target area, moving, touching the target area, vibrating.

Through the description of the above embodiments, those skilled in the art can clearly understand that the method of the above embodiment can be implemented by means of software plus a necessary general hardware platform; of course, the above embodiment can be implemented by means of hardware, but in many cases, the former is a better implementation. Based on such understanding, the technical solution of the present disclosure, which is essential or contributes to the related art, may be embodied in the form of a software product stored in a storage medium (such as ROM/RAM, disk, the optical disc) includes a number of instructions for causing a terminal device (which may be a cell phone, a computer, a server, or a network device, etc.) to perform the methods described in various embodiments of the present disclosure.

Embodiment 4

In this embodiment, an apparatus for processing media information is provided, which is used to implement the above and preferred embodiments, and details which have been described will not be described again. As used below, the term "module" may implement a combination of software and/or hardware of a predetermined function. Although the apparatus described in the following embodiments is preferably implemented in software, in fact, hardware or a combination of software and hardware is also possible and contemplated.

Figure 6:
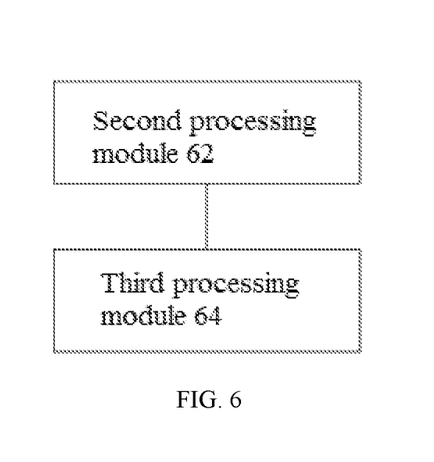
FIG. 6 is a structural block diagram (II) of an apparatus for processing media information according to an embodiment of the present disclosure.

FIG. 6 is a structural block diagram (II) of an apparatus for processing media information according to an embodiment of the present disclosure. As shown in FIG. 6, the apparatus includes:

1) a second processing module 62, configured to receive or read media indication information, wherein the media indication information includes at least one of the followings: a media identifier, a media state type, a media state change type, a media state description, and a media state change description;

2) a third processing module 64, configured to perform corresponding operation according to the media indication information.

Through the apparatus shown in FIG. 6, the problem in the related art that the content covered in the media information during the media interaction is incomplete is solved, and the effect of improving the integrity and extensibility of the media information is achieved.

Alternatively, the media identifier includes at least one of the followings: an identifier for indicating the media type, an identifier for indicating that the media is all or part of the media, and an identifier for indicating content of the all or part of the media.

In an alternative implementation manner, the media state type or the media state change type may be indicated by different identifiers, wherein the media state type or the media state change type includes at least one of the following types: no behavior, tracking target, gazing at a target area, moving, touching the target area, vibrating.

The media state description or media state change description includes at least one of: position information of three-dimensional coordinates, movement velocity type, movement velocity component value, orientation component value, movement duration, vibration frequency, and vibration intensity, wherein the movement velocity type includes: linear movement velocity, angular movement velocity.

Alternatively, the above mentioned performing corresponding operation according to the media indication information includes at least one of the following operations: no behavior, media state update operation, and media action operation.

Embodiment 5

Figure 7:
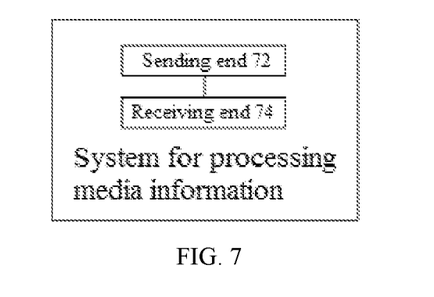
FIG. 7 is a schematic diagram of a system for processing media information according to an embodiment of the present disclosure.

An embodiment of the present disclosure also provides a system for processing media information. As shown in FIG. 7, the system includes:

1) a sending end 72, configured to generate media indication information according to the media state and/or the media state change, and send or store the media indication information, wherein the media indication information includes at least one of the followings: a media identifier, a media state type, media state change type, media state description, media state change description;

2) a receiving end 74, configured to receive or read the media indication information, and perform corresponding operation according to the media indication information.

By means of the system shown in FIG. 7, a relatively complete media information interaction mechanism is implemented on the sending end and the receiving end.

Embodiment 6

An embodiment of the disclosure also provides a storage medium. Alternatively, in the present embodiment, the above storage medium may be configured to store program code for performing the following steps:

in step S1, generating the media indication information according to the media state and/or the media state change, wherein the media indication information includes at least one of the followings: a media identifier, a media state type, a state change type, a media state description, and a media state change description; and in step S2, sending or storing the media indication information.

Alternatively, the storage medium is further configured to store program code for performing the following steps:

in step S3, receiving or reading the media indication information, wherein the media indication information includes at least one of the followings: a media identifier, a media state type, a media state change type, a media state description, and a media state change description; and in step S4, performing operation according to the media indication information.

Alternatively, in this embodiment, the foregoing storage medium may include, but not limited to, a USB drive, a Read-Only Memory (ROM), a Random Access Memory (RAM), a mobile hard disk, and a magnetic memory or optical disk and other storage medium that can store program code.

Alternatively, in the embodiment, a processor executes S1, S2 according to the program code stored in the storage medium.

Alternatively, in the embodiment, a processor executes S3, S4 according to the program code stored in the storage medium.

Alternatively, the specific examples in this embodiment may refer to the examples described in the foregoing embodiments and the optional embodiments, and details are not described herein again.

It will be apparent to those skilled in the art that the various modules or steps of the present disclosure described above can be implemented by a general-purpose computing device that can be centralized on a single computing device or distributed across a network of multiple computing devices. Alternatively, modules or steps may be implemented by program code executable by the computing device such that they may be stored in the storage device by the computing device and, in some cases, may be different from the order herein. The steps shown or described are performed, or they are separately fabricated into individual integrated circuit modules, or a plurality of modules or steps thereof are fabricated as a single integrated circuit module. Thus, the disclosure is not limited to any specific combination of hardware and software.

The above description is only the preferred embodiment of the present disclosure, and is not intended to limit the present disclosure, and various modifications and changes can be made to the present disclosure. Any modifications, equivalent substitutions, improvements, etc., which are made within the spirit and scope of the present disclosure are intended to be included within the scope of the present disclosure.

INDUSTRIAL APPLICABILITY

The method for processing the media information provided by the embodiment of the present disclosure generates the media indication information covering the complete content according to the media state and/or the state change, and solves the problem that the content covered in the media information is incomplete during the media interaction in the related art. The effect of improving of the integrity and extensibility of media information is achieved.

What is claimed is:

1. A media information processing method, comprising:
constructing a basic model which includes media information, an interaction target, an interaction type, and interaction content;
generating an interaction signaling message by using the interaction model according to at least one of media state or media state change, wherein the interaction signaling message indicates media indication information, wherein the media indication information includes a media identifier, at least one of a media state type or a media state change type, and at least one of a media state description or a media state change description; and
sending interaction signaling message,
wherein
the media information is used for indicating a source of the interaction signaling message, an identity of a user, media content being currently consumed by the user, the number of interactions included in the interaction signaling message, and time of a current interaction;
the interaction target is used for indicating a target of the current interaction;
the interaction type includes at least one of the media state type or the media state change type, and is used for indicating a type of interaction behavior for the target of the current interaction;
the interaction content includes at least one of the media state description or the media state change description;
the media identifier is indicated by the media information and the interaction target; and
the media state type or the media state change type includes at least one of the following types: no behavior, tracking target, gazing at a target area, moving, touching the target area, and vibrating.

2. The method according to claim 1, wherein the media identifier includes at least one of: an identifier for indicating media type, an identifier for indicating that the media is all or part of media, and an identifier for indicating content of the all or part of the media, or
the media state type or the media state change type is indicated by different identifiers.

3. The method according to claim 1, wherein the media state description or the media state change description comprises at least one of the following:
position information of three-dimensional coordinates, movement velocity type, movement velocity component value, orientation component value, movement duration, vibration frequency, and vibration intensity, wherein the movement velocity type includes linear movement velocity and angular movement velocity.

4. A media information processing method, comprising:
receiving or reading media indication information indicated by an interaction signaling message generated by using a interaction model, wherein the media indication information according to at least one of media state or media state change comprises at least one of: a media identifier, at least one of a media state type or a media state change type, and at least one of a media state description or a media state change description; and
performing an operation according to the media indication information,
wherein
the basic model includes media information, an interaction target, an interaction type, and interaction content;
the media information is used for indicating a source of the interaction signaling message, an identity of a user, media content being currently consumed by the user, the number of interactions included in the interaction signaling message, and time of a current interaction;
the interaction target is used for indicating a target of the current interaction;
the interaction type includes at least one of the media state type or the media state change type, and is used for indicating a type of interaction behavior for the target of the current interaction;
the interaction content includes at least one of the media state description or the media state change description;
the media identifier is indicated by the media information and the interaction target; and
the media state type or the media state change type includes at least one of the following types: no behav-

17 ior, tracking target, gazing at a target area, moving, touching the target area, and vibrating.

5. The method according to claim 4, wherein the media identifier includes at least one of: an identifier for indicating media type, an identifier for indicating that the media is all or part of media, and an identifier for indicating content of the all or part of the media, or the media state type or the media state change type is indicated by different identifiers.

6. The method according to claim 4, wherein the media state description or the media state change description comprises at least one of the following:

position information of three-dimensional coordinates, movement velocity type, movement velocity component value, orientation component value, movement duration, vibration frequency, and vibration intensity, wherein the movement velocity type includes linear movement velocity and angular movement velocity.

7. The method according to claim 4, wherein performing an operation according to the media indication information comprises at least one of the following operations: no operation, media state update operation, and media action operation.

8. A media information processing apparatus, applied to a sending end, comprising:

a processor; and a memory for storing instructions executable by the processor;

wherein the processor is configured to implement a method that comprises:

constructing a basic model which includes media information, an interaction target, an interaction type, and interaction content;

generating an interaction signaling message by using the interaction model according to at least one of media state or media state change, wherein the interaction signaling message indicates media indication information, wherein the media indication information includes a media identifier, at least one of a media state type or a media state change type, and at least one of a media state description or a media state change description; and sending interaction signaling message, wherein the media information is used for indicating a source of the interaction signaling message, an identity of a user, media content being currently consumed by the user, the number of interactions included in the interaction signaling message, and time of a current interaction;

the interaction target is used for indicating a target of the current interaction;

the interaction type includes at least one of the media state type or the media state change type, and is used for indicating a type of interaction behavior for the target of the current interaction;

the interaction content includes at least one of the media state description or the media state change description;

the media identifier is indicated by the media information and the interaction target; and the media state type or the media state change type includes at least one of the following types: no behavior, tracking target, gazing at a target area, moving, touching the target area, and vibrating.

18

9. A media information processing apparatus, applied to a receiving end, comprising:

a processor; and a memory for storing instructions executable by the processor;

wherein the processor is configured to implement a method that comprises:

receiving or reading media indication information indicated by an interaction signaling message generated by using a interaction model, wherein the media indication information according to at least one of media state or media state change comprises at least one of a media identifier, at least one of a media state type or a media state change type, and at least one of a media state description or a media state change description; and performing an operation according to the media indication information, wherein the basic model includes media information, an interaction target, an interaction type, and interaction content:

the media information is used for indicating a source of the interaction signaling message, an identity of a user, media content being currently consumed by the user, the number of interactions included in the interaction signaling message, and time of a current interaction;

the interaction target is used for indicating a target of the current interaction;

the interaction type includes at least one of the media state type or the media state change type, and is used for indicating a type of interaction behavior for the target of the current interaction;

the interaction content includes at least one of the media state description or the media state change description;

the media identifier is indicated by the media information and the interaction target; and the media state type or the media state change type includes at least one of the following types: no behavior, tracking target, gazing at a target area, moving, touching the target area, and vibrating.

10. A media information processing system, comprising:

a sending end, wherein the sending end comprises:

a processor; and a memory for storing instructions executable by the processor, the instructions when executed cause the processor to perform:

constructing a basic model which includes media information, an interaction target, an interaction type, and interaction content;

generating an interaction signaling message by using the interaction model according to at least one of media state or media state change, wherein the interaction signaling message indicates media indication information, wherein the media indication information includes a media identifier, at least one of a media state type or a media state change type, and at least one of a media state description or a media state change description; and sending interaction signaling message;

and a receiving end, wherein the receiving end comprises:

a processor; and a memory for storing instructions executable by the processor, the instructions when executed cause the processor to perform:

receiving or reading media indication information indicated by an interaction signaling message generated by using a interaction model, wherein the media indication information according to at least one of media state or media state change comprises at least one of: a media identifier, at least one of a media state type or a media state change type, and at least one of a media state description or a media state change description; and performing an operation according to the media indication information;

wherein the basic model includes media information, an interaction target, an interaction type, and interaction content;

the media information is used for indicating a source of the interaction signaling message, an identity of a user, media content being currently consumed by the user, the number of interactions included in the interaction signaling message, and time of a current interaction;

the interaction target is used for indicating a target of the current interaction;

the interaction type includes at least one of the media state type or the media state change type, and is used for indicating a type of interaction behavior for the target of the current interaction:

the interaction content includes at least one of the media state description or the media state change description;

the media identifier is indicated by the media information and the interaction target; and the media state type or the media state change type includes at least one of the following types: no behavior, tracking target, gazing at a target area, moving, touching the target area, and vibrating.

11. A non-transitory storage medium, configured to store program code for performing the following steps:

constructing a basic model which includes media information, an interaction target, an interaction type, and interaction content;

generating an interaction signaling message by using the interaction model according to at least one of media state or media state change, wherein the interaction signaling message indicates media indication information, wherein the media indication information includes a media identifier, at least one of a media state type or a media state change type, and at least one of a media state description or a media state change description; and sending the interaction signaling message wherein the media information is used for indicating a source of the interaction signaling message, an identity of a user, media content being currently consumed by the user, the number of interactions included in the interaction signaling message, and time of a current interaction;

the interaction target is used for indicating a target of the current interaction;

the interaction type includes at least one of the media state type or the media state change type, and is used for indicating a type of interaction behavior for the target of the current interaction;

the interaction content includes at least one of the media state description or the media state change description;

the media identifier is indicated by the media information and the interaction target; and the media state type or the media state change type includes at least one of the following types: no behavior, tracking target, gazing at a target area, moving, touching the target area, and vibrating.

* * * * *